United States Patent
Cho et al.

(10) Patent No.: US 9,541,169 B2
(45) Date of Patent: Jan. 10, 2017

(54) MULTI-STAGE TRANSMISSION FOR VEHICLE

(71) Applicant: Hyundai Motor Company, Seoul (KR)

(72) Inventors: Won Min Cho, Hwaseong-si (KR); Jae Chang Kook, Hwaseong-si (KR); Seong Wook Hwang, Gunpo-si (KR); Hyun Sik Kwon, Seoul (KR); Seong Wook Ji, Ansan-si (KR); Kang Soo Seo, Yongin-si (KR); Myeong Hoon Noh, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/936,974

(22) Filed: Nov. 10, 2015

(65) Prior Publication Data

US 2016/0363194 A1    Dec. 15, 2016

(30) Foreign Application Priority Data

Jun. 11, 2015  (KR) .................. 10-2015-0082783

(51) Int. Cl.
*F16H 3/66* (2006.01)

(52) U.S. Cl.
CPC ......... *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS

| | | | |
|---|---|---|---|
| 7,993,235 B2 | 8/2011 | Wittkopp et al. | |
| 8,038,566 B2 | 10/2011 | Phillips et al. | |
| 8,303,455 B2 | 11/2012 | Gumpoltsberger et al. | |
| 2008/0182706 A1* | 7/2008 | Phillips | F16H 3/66 475/276 |
| 2008/0242486 A1* | 10/2008 | Hart | F16H 3/66 475/276 |
| 2010/0216588 A1* | 8/2010 | Wittkopp | F16H 3/66 475/275 |
| 2012/0115672 A1* | 5/2012 | Gumpoltsberger | F16H 3/66 475/276 |
| 2012/0122627 A1* | 5/2012 | Gumpoltsberger | F16H 3/66 475/276 |

* cited by examiner

*Primary Examiner* — Justin Holmes
(74) *Attorney, Agent, or Firm* — Morgan, Lewis & Bockius LLP

(57) ABSTRACT

A multi-stage transmission for vehicle includes an input shaft, an output shafts, first to fourth planetary gear devices each having three rotary elements and transmitting rotary forces between the input and output shafts, and at least six shifting elements connected to the rotary elements of the planetary gear devices. Of the first planetary gear device, the first rotary element is permanently connected to the input shaft and the second rotary element of the third planetary gear device, the second rotary element is installed to be fixable by any one of the shifting elements and variably connected to the first rotary element and third rotary element of the second planetary gear device, and the third rotary element is permanently connected to the second rotary element of the second planetary gear device.

8 Claims, 2 Drawing Sheets

FIG. 2

| Shifting stage | CL1 | CL2 | CL3 | CL4 | CL5 | CL6 | Gear ratio |
|---|---|---|---|---|---|---|---|
| 1ST |  | O | O |  |  | O | 3.500 |
| 2ND |  |  | O |  | O | O | 2.200 |
| 3RD |  |  | O | O |  | O | 1.784 |
| 4TH |  |  |  | O | O | O | 1.532 |
| 5TH |  | O |  | O |  | O | 1.471 |
| 6TH |  | O |  |  | O | O | 1.302 |
| 7TH |  | O | O | O | O |  | 1.000 |
| 8TH | O | O |  |  | O |  | 0.787 |
| 9TH | O | O |  | O |  |  | 0.687 |
| 10TH | O |  | O |  | O |  | 0.520 |
| REV | O | O |  |  |  | O | −3.625 |

MULTI-STAGE TRANSMISSION FOR VEHICLE

CROSS-REFERENCE TO RELATED APPLICATION

The present application claims priority of Korean Patent Application Number 10-2015-0082783 filed Jun. 11, 2015, the entire contents of which application are incorporated herein for all purposes by this reference.

BACKGROUND OF THE INVENTION

Field of the Invention

The present invention relates to a multi-stage transmission for a vehicle, and more particularly, to a multi-stage transmission technology capable of improving fuel efficiency of a vehicle by implementing highest possible number, of shifting stages using fewer components and simpler configuration.

Description of Related Art

Recently, a rise in an oil price has become a factor pushing automobile manufacturers throughout the world to enter into unlimited competition toward fuel efficiency improvement, and in the case of an engine, efforts to improve fuel efficiency and decrease a weight through a technology such as downsizing, or the like, have been conducted.

Meanwhile, among methods of improving fuel efficiency that may be made by a transmission mounted in a vehicle, there is a method of allowing an engine to be driven at a more efficient driving point through a multi-staging of a transmission to ultimately improve fuel efficiency.

Further, the multi-staging of a transmission as described above allows an engine to be driven in a relatively low revolution per minute (RPM) range to further improve silence of the vehicle.

However, as the number of shifting stages of a transmission increases, the number of internal parts constituting the transmission also increases, such that a mounting feature and transfer efficiency may be deteriorated and a cost and a weight may be increased. Therefore, in order to maximize fuel efficiency improving effect through the multi-staging of a transmission, it is important to devise a transmission structure capable of deriving maximum efficiency by a small number of parts and a comparatively simple configuration.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

Accordingly, the present invention has been made keeping in mind the above problems occurring in the related art and/or other problems, and the present invention is intended to provide a multi-stage transmission for a vehicle that is able to realize at least ten forward shifting stages and one reverse shifting stage with a relatively smaller number of parts and a simple configuration such that an engine may be operated at an optimal operation points, thereby maximizing an improvement in the fuel efficiency of the vehicle, and the engine may be operated more quietly, thereby improving the performance of the vehicle.

In order to achieve the above object and/or other objects, according to various aspects of the present invention, a multi-stage transmission for a vehicle may include an input shaft; an output shaft; first, second, third, and fourth planetary gear devices each having three rotating elements disposed between the input shaft and the output shaft to transfer a torque; and at least six shifting elements connected to the rotating elements of the planetary gear devices. A first rotating element of the first planetary gear device may be permanently connected to the input shaft and a second rotating element of the third planetary gear device, a second rotating element of the first planetary gear device may be installed to be fixable by one shifting element of the at least six shifting elements and variably connected to a first rotating element and a third rotating element of the second planetary gear device, and a third rotating element of the first planetary gear device may be permanently connected to a second rotating element of the second planetary gear device. The first rotating element of the second planetary gear device may be variably connected to a first rotating element of the third planetary gear device, the second rotating element of the second planetary gear device may be variably connected to the first rotating element of the third planetary gear device, and the third rotating element of the second planetary gear device may be variably connected to a first rotating element of the fourth planetary gear device. A third rotating element of the third planetary gear device may be permanently connected to a second rotating element of the fourth planetary gear device and the output shaft. A third rotating element of the fourth planetary gear device may be permanently fixed.

The first planetary gear device, the second planetary gear device, the third planetary gear device and the fourth planetary gear device may be sequentially arranged along an axial direction of the input shaft or the output shaft.

The second rotating element of the first planetary gear device may be installed to be fixable to a transmission case by means of a first clutch of the at least six shifting elements; and the other shifting elements of the at least six shifting elements may be configured to constitute variable connection structures between the rotating elements of the planetary gear devices.

A second clutch of the at least six shifting elements may form a variable connection structure between the second rotating element of the first planetary gear device and the first rotating element of the second planetary gear device; a third clutch of the at least six shifting elements may form a variable connection structure between the second rotating element of the first planetary gear device and the third rotating element of the second planetary gear device; a fourth clutch of the at least six shifting elements may form a variable connection structure between the second rotating element of the second planetary gear device and the first rotating element of the third planetary gear device; a fifth clutch of the at least six shifting elements may form a variable connection structure between the first rotating element of the second planetary gear device and the first rotating element of the third planetary gear device; and a sixth clutch of the at least six shifting elements may form a variable connection structure between the third rotating element of the second planetary gear device and the first rotating element of the fourth planetary gear device.

In order to achieve the above object and/or other objects, according to various aspects of the present invention, a multi-stage transmission for a vehicle may include first, second, third and fourth planetary gear devices each having three rotating elements, respectively; six shifting elements configured to variably provide frictional forces; and first, second, third, fourth, fifth, sixth, seventh and eighth rotary shafts connected to the rotating elements of the first, second, third, and fourth planetary gear devices. The first rotary shaft may be the input shaft directly connected to a first rotating element of the first planetary gear device and a second rotating element of the third planetary gear device, the second rotary shaft may be directly connected to a second rotating element of the first planetary gear device, the third rotary shaft may be directly connected to a third rotating element of the first planetary gear device and a second rotating element of the second planetary gear device, the fourth rotary shaft may be directly connected to a third rotating element of the second planetary gear device, the fifth rotary shaft may be directly connected to a first rotating element of the second planetary gear device, the sixth rotary shaft may be directly connected to a first rotating element of the third planetary gear device, the seventh rotary shaft may be directly connected to the first rotating element of the fourth planetary gear device, and the eighth rotary shaft may be the output shaft directly connected to a third rotating element of the third planetary gear device and a second rotating element of the fourth planetary gear device; wherein the six shifting elements may include first, second, third, fourth, fifth, and sixth clutches, the first clutch may be disposed between the second rotary shaft and a transmission case, the second clutch may be disposed between the second rotary shaft and the fifth rotary shaft, the third clutch may be disposed between the second rotary shaft and the fourth rotary shaft, the fourth clutch may be disposed between the third rotary shaft and the sixth rotary shaft, the fifth clutch may be disposed between the fifth rotary shaft and the sixth rotary shaft, and the sixth clutch may be disposed between the fourth rotary shaft and the seventh rotary shaft.

The first planetary gear device, the second planetary gear device, the third planetary gear device and the fourth planetary gear device may be sequentially arranged along an axial direction of the input shaft or the output shaft.

The second clutch of the at least six shifting elements may form a variable connection structure between the second rotating element of the first planetary gear device and the first rotating element of the second planetary gear device, the third clutch of the at least six shifting elements may form a variable connection structure between the second rotating element of the first planetary gear device and the third rotating element of the second planetary gear device, the fourth clutch of the at least six shifting elements may form a variable connection structure between the second rotating element of the second planetary gear device and the first rotating element of the third planetary gear device, the fifth clutch of the at least six shifting elements may form a variable connection structure between the first rotating element of the second planetary gear device and the first rotating element of the third planetary gear device, and the sixth clutch of the at least six shifting elements may form a variable connection structure between the third rotating element of the second planetary gear device and the first rotating element of the fourth planetary gear device.

According to the present invention as set forth above, the multi-stage transmission for a vehicle can realize at least ten forward shifting stages and one reverse shifting stage with a relatively small number of parts and a simple configuration such that the engine may be operated at optimum operation points, thereby maximizing an improvement in the fuel efficiency of the vehicle, and the engine may be operated more quietly, thereby improving the quietness of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and advantages of the present invention will be more clearly understood from the following detailed description when taken in conjunction with the accompanying drawings, in which:

FIG. 2 illustrates an operation mode table of the transmission shown in FIG. 1.

DESCRIPTION OF SPECIFIC EMBODIMENTS

Figure 1:
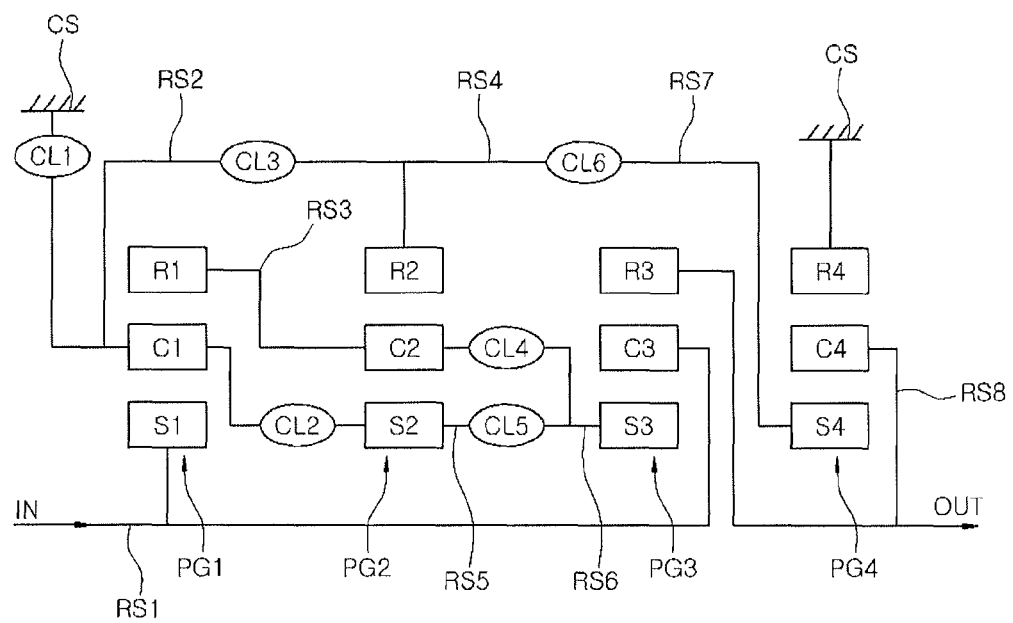
FIG. 1 is a diagram illustrating the configuration of a multi-stage transmission for a vehicle according to an exemplary embodiment of the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims Referring to FIG. 1, a multi-stage transmission for a vehicle according to an exemplary embodiment of the present invention may include an input shaft IN; an output shaft OUT; a first planetary gear device PG1, a second planetary gear device PG2, a third planetary gear device PG3, and a fourth planetary gear device PG4 disposed between the input shaft IN and/or the output shaft OUT to transmit rotary force, each of the first to fourth planetary gear devices PG1 to PG4 having three rotating elements, respectively; and at least six shifting elements connected to rotating elements of the first to fourth planetary gear devices PG1 to PG4.

A first rotating element S1 of the first planetary gear device PG1 may be permanently connected to the input shaft IN and a second rotating element C3 of the third planetary gear device PG3. A second rotating element C1 of the first planetary gear device PG1 may be installed to be fixable by one shifting element of the at least six shifting elements and variably connected to a first rotating element S2 of the second planetary gear device PG2 and a third rotating element R2 of the second planetary gear device PG2. A third rotating element R1 of the first planetary gear device PG1 may be permanently connected to a second rotating element C2 of the second planetary gear device PG2.

The first rotating element S2 of the second planetary gear device PG2 may be variably connected to a first rotating element S3 of the third planetary gear device PG3. The second rotating element C2 of the second planetary gear device PG2 may be variably connected to the first rotating element S3 of the third planetary gear device PG3. The third rotating element R2 of the second planetary gear device PG2 may be variably connected to a first rotating element S4 of the fourth planetary gear device PG4.

A third rotating element R3 of the third planetary gear device PG3 may be permanently connected to a second rotating element C4 of the fourth planetary gear device PG4 and the output shaft OUT. A third rotating element R4 of the fourth planetary gear device PG4 may be permanently fixed.

The first planetary gear device PG1, the second planetary gear device PG2, the third planetary gear device PG3 and the fourth planetary gear device PG4 may be sequentially arranged along the axial direction of the input shaft IN and/or the output shaft OUT.

The second rotating element C1 of the first planetary gear device PG1 is installed to be fixable to a transmission case CS by means of a first clutch CL1 of the at least six shifting elements.

Therefore, the first clutch CL1 functions as a brake such that the second rotating element C1 of the first planetary gear device PG1 may be converted to rotatable state or restrained state not to be rotated by means of the operation of the second clutch CL2.

The other shifting elements of the at least six shifting elements may be configured to constitute variable connection structures between the rotating elements of the planetary gear devices.

That is, a second clutch CL2 of the at least six shifting elements may form a variable connection structure between the second rotating element C1 of the first planetary gear device PG1 and the first rotating element S2 of the second planetary gear device PG2. A third clutch CL3 of the at least six shifting elements may form a variable connection structure between the second rotating element C1 of the first planetary gear device PG1 and the third rotating element R2 of the second planetary gear device PG2. A fourth clutch CL4 of the at least six shifting elements may form a variable connection structure between the second rotating element C2 of the second planetary gear device PG2 and the first rotating element S3 of the third planetary gear device PG3. A fifth clutch CL5 of the at least six shifting elements may form a variable connection structure between the first rotating element S2 of the second planetary gear device and the first rotating element S3 of the third planetary gear device PG3. A sixth clutch CL6 of the at least six shifting elements may form a variable connection structure between the third rotating element R2 of the second planetary gear device PG2 and the first rotating element S4 of the fourth planetary gear device PG4.

In the exemplary embodiment, the first rotating element S1, the second rotating element C1 and the third rotating element R1 of the first planetary gear device PG1 are a first sun gear, a first carrier and a first ring gear, respectively. The first rotating element S2, the second rotating element C2 and the third rotating element R2 of the second planetary gear device PG2 are a second sun gear, a second carrier and a second ring gear, respectively. The first rotating element S3, the second rotating element C3 and the third rotating element R3 of the third planetary gear device PG3 are a third sun gear, a third carrier and a third ring gear, respectively. The first rotating element S4, the second rotating element C4 and the third rotating element R4 of the fourth planetary gear device PG4 are a fourth sun gear, a fourth carrier and a fourth ring gear, respectively.

The multi-stage transmission for a vehicle configured as above may also be presented as follows.

Specifically, the multi-stage transmission for a vehicle according to the present invention may include a first planetary gear device PG1, a second planetary gear device PG2, a third planetary gear device PG3, and a fourth planetary gear device PG4 each having the three rotating elements; the six shifting elements configured to variably provide frictional force; and eight rotary shafts connected to the rotating elements of the first to fourth planetary gear devices PG1, PG2, PG3, and PG4.

Hence, of the eight rotary shafts, the first rotary shaft RS1 is the input shaft IN directly connected to a first rotating element S1 of the first planetary gear device PG1 and a second rotating element C3 of the third planetary gear device PG3. The second rotary shaft RS2 is directly connected to a second rotating element C1 of the first planetary gear device PG1. The third rotary shaft RS3 is directly connected to a third rotating element R1 of the first planetary gear device PG1 and a second rotating element C2 of the second planetary gear device PG2. The fourth rotary shaft RS4 is directly connected to a third rotating element R2 of the second planetary gear device PG2. The fifth rotary shaft RS5 is directly connected to a first rotating element S2 of the second planetary gear device PG2. The sixth rotary shaft RS6 is directly connected to a first rotating element S3 of the third planetary gear device PG3. The seventh rotary shaft RS7 is directly connected to the first rotating element S4 of the fourth planetary gear device PG4. The eighth rotary shaft RS8 is the output shaft OUT directly connected to a third rotating element R3 of the third planetary gear device PG3 and a second rotating element C4 of the fourth planetary gear device PG4.

In addition, the first clutch CL1 among the six shifting elements is disposed between the second rotary shaft RS2 and a transmission case CS. The second clutch CL2 among the six shifting elements is disposed between the second rotary shaft RS2 and the fifth rotary shaft RS5. The third clutch CL3 among the six shifting elements is disposed between the second rotary shaft RS2 and the fourth rotary shaft RS4. The fourth clutch CL4 among the six shifting elements is disposed between the third rotary shaft RS3 and the sixth rotary shaft RS6. The fifth clutch CL5 among the six shifting elements is disposed between the fifth rotary shaft RS5 and the sixth rotary shaft RS6. The sixth clutch CL6 among the six shifting elements is disposed between the fourth rotary shaft RS4 and the seventh rotary shaft RS7.

As set forth above, the multi-stage transmission for a vehicle according to the present invention including the four simple planetary gear devices and the six shifting elements realizes ten forward shifting stages and one reverse shifting stage according to the operation mode table as illustrated in FIG. 2. Since the multi-stage shifting stages of ten shifting stages can be embodied based on a relatively small number of parts and a simple configuration, the multi-stage transmission for a vehicle can contribute to the improved fuel efficiency and quietness of a vehicle, thereby ultimately improving the marketability of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A multi-stage transmission for a vehicle, comprising:
an input shaft and an output shaft;
first, second, third and fourth planetary gear devices each having three rotating elements disposed between the input shaft and the output shaft to transfer a torque; and
at least six shifting elements connected to the rotating elements of the planetary gear devices;
wherein a first rotating element of the first planetary gear device is permanently connected to the input shaft and a second rotating element of the third planetary gear device, a second rotating element of the first planetary gear device is installed to be fixable by one shifting element of the at least six shifting elements and variably connected to a first rotating element of the second planetary gear device and a third rotating element of the second planetary gear device, and a third rotating element of the first planetary gear device is permanently connected to a second rotating element of the second planetary gear device;
wherein the first rotating element of the second planetary gear device is variably connected to a first rotating element of the third planetary gear device, the second rotating element of the second planetary gear device is variably connected to the first rotating element of the third planetary gear device, and the third rotating element of the second planetary gear device is variably connected to a first rotating element of the fourth planetary gear device;
wherein a third rotating element of the third planetary gear device is permanently connected to a second rotating element of the fourth planetary gear device and the output shaft; and
wherein a third rotating element of the fourth planetary gear device is permanently fixed.

2. The multi-stage transmission according to claim 1, wherein the first planetary gear device, the second planetary gear device, the third planetary gear device and the fourth planetary gear device are sequentially arranged along an axial direction of the input shaft or the output shaft.

3. The multi-stage transmission according to claim 2, wherein:
the second rotating element of the first planetary gear device is installed to be fixable to a transmission case by means of a first clutch of the at least six shifting elements; and
the other shifting elements of the at least six shifting elements are configured to constitute variable connection structures between the rotating elements of the planetary gear devices.

4. The multi-stage transmission according to claim 3, wherein:
a second clutch of the at least six shifting elements forms a variable connection structure between the second rotating element of the first planetary gear device and the first rotating element of the second planetary gear device;
a third clutch of the at least six shifting elements forms a variable connection structure between the second rotating element of the first planetary gear device and the third rotating element of the second planetary gear device;
a fourth clutch of the at least six shifting elements forms a variable connection structure between the second rotating element of the second planetary gear device and the first rotating element of the third planetary gear device;
a fifth clutch of the at least six shifting elements forms a variable connection structure between the first rotating element of the second planetary gear device and the first rotating element of the third planetary gear device; and
a sixth clutch of the at least six shifting elements forms a variable connection structure between the third rotating element of the second planetary gear device and the first rotating element of the fourth planetary gear device.

5. A multi-stage transmission for a vehicle, comprising:
first, second, third and fourth planetary gear devices each having three rotating elements;
six shifting elements configured to variably provide frictional forces; and
first, second, third, fourth, fifth, sixth, seventh and eighth rotary shafts connected to the rotating elements of the first, second, third and fourth planetary gear devices,
wherein the first rotary shaft is an input shaft directly connected to a first rotating element of the first planetary gear device and a second rotating element of the third planetary gear device, the second rotary shaft is directly connected to a second rotating element of the first planetary gear device, the third rotary shaft is directly connected to a third rotating element of the first planetary gear device and a second rotating element of the second planetary gear device, the fourth rotary shaft is directly connected to a third rotating element of the second planetary gear device, the fifth rotary shaft is directly connected to a first rotating element of the second planetary gear device, the sixth rotary shaft is directly connected to a first rotating element of the third planetary gear device, the seventh rotary shaft is directly connected to the first rotating element of the fourth planetary gear device, and the eighth rotary shaft is an output shaft directly connected to a third rotating element of the third planetary gear device and a second rotating element of the fourth planetary gear device; and
wherein the six shifting elements include first, second, third, fourth, fifth and sixth clutches, the first clutch is disposed between the second rotary shaft and a transmission case, the second clutch is disposed between the second rotary shaft and the fifth rotary shaft, the third clutch is disposed between the second rotary shaft and the fourth rotary shaft, the fourth clutch is disposed between the third rotary shaft and the sixth rotary shaft, the fifth clutch is disposed between the fifth rotary shaft and the sixth rotary shaft, and the sixth clutch is disposed between the fourth rotary shaft and the seventh rotary shaft.

6. The multi-stage transmission according to claim 5, wherein the first planetary gear device, the second planetary gear device, the third planetary gear device and the fourth planetary gear device are sequentially arranged along an axial direction of the input shaft or the output shaft.

7. The multi-stage transmission according to claim 5, wherein:
the second clutch of the at least six shifting elements forms a variable connection structure between the second rotating element of the first planetary gear device and the first rotating element of the second planetary gear device,
the third clutch of the at least six shifting elements forms a variable connection structure between the second rotating element of the first planetary gear device and the third rotating element of the second planetary gear device, the fourth clutch of the at least six shifting elements forms a variable connection structure between the second rotating element of the second planetary gear device and the first rotating element of the third planetary gear device, the fifth clutch of the at least six shifting elements forms a variable connection structure between the first rotating element of the second planetary gear device and the first rotating element of the third planetary gear device, and the sixth clutch of the at least six shifting elements forms a variable connection structure between the third rotating element of the second planetary gear device and the first rotating element of the fourth planetary gear device.

8. The multi-stage transmission according to claim 5, wherein:

the third rotating element of the fourth planetary gear device is permanently connected to the transmission case.

\* \* \* \* \*